US011812522B2

(12) United States Patent
Tsubata et al.

(10) Patent No.: US 11,812,522 B2
(45) Date of Patent: Nov. 7, 2023

(54) HEATING DEVICE AND METHOD FOR DETECTING FAILURE OF HEATING DEVICE

(71) Applicant: OMRON Corporation, Kyoto (JP)

(72) Inventors: Hajime Tsubata, Kusatsu (JP); Takaaki Yamada, Kusatsu (JP); Takeshi Wakabayashi, Kyoto (JP)

(73) Assignee: OMRON Corporation, Kyoto (JP)

( * ) Notice: Subject to any disclaimer, the term of this patent is extended or adjusted under 35 U.S.C. 154(b) by 938 days.

(21) Appl. No.: 16/639,551

(22) PCT Filed: Jan. 22, 2019

(86) PCT No.: PCT/JP2019/001743
§ 371 (c)(1),
(2) Date: Feb. 14, 2020

(87) PCT Pub. No.: WO2019/167473
PCT Pub. Date: Sep. 6, 2019

(65) Prior Publication Data
US 2021/0136872 A1 May 6, 2021

(30) Foreign Application Priority Data
Mar. 2, 2018 (JP) ................ 2018-037074

(51) Int. Cl.
G05D 23/19 (2006.01)
H05B 1/02 (2006.01)
(Continued)

(52) U.S. Cl.
CPC ............... H05B 1/02 (2013.01); G05D 23/00 (2013.01); G05D 23/1902 (2013.01); G05B 6/02 (2013.01);
(Continued)

(58) Field of Classification Search
None
See application file for complete search history.

(56) References Cited

U.S. PATENT DOCUMENTS 3,315,063 A * 4/1967 Ihlenfeldt .......... G05D 23/1904
219/498
5,681,494 A 10/1997 Suzuki et al.
(Continued)

FOREIGN PATENT DOCUMENTS

CN 1645158 7/2005
CN 1834817 9/2006
(Continued)

OTHER PUBLICATIONS

"Office Action of China Counterpart Application", dated Jun. 30, 2021, with English translation thereof, p. 1-p. 12.
(Continued)

Primary Examiner — Joseph M. Pelham
(74) Attorney, Agent, or Firm — JCIPRNET

(57) ABSTRACT

A heating device (100) comprises: a heater (10) for heating an item (1); a temperature detection unit (20) for detecting the temperature of the item (1); and a temperature adjustment unit (30) for controlling the heater (10) on the basis of a target temperature and the detected value of the temperature detection unit (20) so that the temperature of the item (1) reaches the target temperature. The heating device (100) determines, as a system gain change rate, the rate of change from the initial value of a system gain determined as a ratio of a temperature increase value of the item (1) with respect to electric power inputted to the heater (10), and determines the rate of change in the heat retention of the item (1) using the system gain change rate.

8 Claims, 5 Drawing Sheets

(51) Int. Cl.
*G05D 23/00* (2006.01)
*G05B 6/02* (2006.01)

(52) U.S. Cl.
CPC ........ *H05B 1/023* (2013.01); *H05B 2203/035* (2013.01)

(56) References Cited

U.S. PATENT DOCUMENTS

| | | | | |
|---|---|---|---|---|
| 11,003,150 | B2* | 5/2021 | Wada | G05B 23/0221 |
| 2007/0119846 | A1 | 5/2007 | Girelli et al. | |
| 2020/0187304 | A1* | 6/2020 | Yamada | G05D 23/1919 |
| 2021/0093065 | A1* | 4/2021 | Mafuve | H05B 3/262 |

FOREIGN PATENT DOCUMENTS

| | | | | |
|---|---|---|---|---|
| CN | 1847786 | | 10/2006 | |
| CN | 101990707 | | 3/2011 | |
| CN | 103875308 | | 6/2014 | |
| CN | 104955178 | | 9/2015 | |
| CN | 106248075 | | 12/2016 | |
| CN | 107427080 | | 12/2017 | |
| GB | 2569660 | A * | 6/2019 | A45D 1/04 |
| JP | 2001265447 | | 9/2001 | |
| JP | 2001265448 | | 9/2001 | |
| JP | 2003167605 | | 6/2003 | |
| JP | 2007293474 | | 11/2007 | |
| JP | 2008025958 | | 2/2008 | |
| JP | 2008217317 | | 9/2008 | |
| JP | 2010003133 | | 1/2010 | |
| JP | 4481953 | | 6/2010 | |
| JP | 2011232025 | | 11/2011 | |
| TW | M406757 | | 7/2011 | |
| TW | 201606252 | | 2/2016 | |
| WO | WO-2016080039 | A1 * | 5/2016 | |

OTHER PUBLICATIONS

"Search Report of Europe Counterpart Application", dated Oct. 22, 2021, p. 1-p. 7.

"International Search Report (Form PCT/ISA/210) of PCT/JP2019/001743 ," dated Apr. 16, 2019, with English translation thereof, pp. 1-4.

"Written Opinion of the International Searching Authority (Form PCT/ISA/237) of PCT/JP2019/001743," dated Apr. 16, 2019, with English translation thereof, pp. 1-6.

Office Action of Taiwan Counterpart Application, with English translation thereof, dated Nov. 7, 2019, pp. 1-6.

\* cited by examiner (A)

(B)

(A)

(B)

| State | Abnormal state | | |
|---|---|---|---|
| | Heater resistance value | Heater voltage | Heat-retaining properties |
| 1 | Normal | Normal | Abnormal |
| 2 | Normal | Abnormal | Normal |
| 3 | Normal | Abnormal | Abnormal |
| 4 | Abnormal | Normal | Normal |
| 5 | Abnormal | Normal | Abnormal |
| 6 | Abnormal | Abnormal | Normal |
| 7 | Abnormal | Abnormal | Abnormal |

FIG. 7

HEATING DEVICE AND METHOD FOR DETECTING FAILURE OF HEATING DEVICE

CROSS-REFERENCE TO RELATED APPLICATION

This application is a 371 application of the International PCT application serial no. PCT/JP2019/001743, filed on Jan. 22, 2019, which claims the priority benefits of Japan Patent Application No. 2018-037074, filed on Mar. 2, 2018. The entirety of each of the above-mentioned patent applications is hereby incorporated by reference herein and made a part of this specification.

TECHNICAL FIELD

The present invention relates to a heating device that includes a heater configured to heat an item, a temperature detection unit configured to detect a temperature of the heated item, and a temperature adjustment unit configured to control the heater. Also, the invention relates to a method for detecting a failure in a heating device.

BACKGROUND ART

In the related art, a method for detecting a failure in a feedback system on the basis of an actual temperature measurement value in a temperature control loop and a temperature prediction value predicted using a model has been proposed as a technology for detecting a failure in a heating device. For example, Patent Literature 1 discloses a method of determining a state of a control target with reference to a behavior in a control transient state, a representative example of which is a step response.

CITATION LIST

Patent Literature

[Patent Literature 1]
Japanese Patent No. 4481953

SUMMARY OF INVENTION

Technical Problem

According to a method for determining a state of a control target on the basis of a behavior of a feedback system when a transient state is caused to occur as disclosed in Patent Literature 1, it is not possible to detect the extent of the respective changes related to heat retention of a heated item.

Thus, an objective of the invention is to provide a heating device and a failure detecting method of a heating device capable of detecting a change related to heat retention of a heated item.

Solution to Problem

As an example of the disclosure, there is provided a heating device that includes a heater configured to heat an item, a temperature detection unit configured to detect a temperature of the heated item, and a temperature adjustment unit configured to control the heater on the basis of a detected value of the temperature detection unit and a target temperature so that the temperature of the heated item reaches the target temperature, the heating device including;

a system gain change rate calculation unit configured to obtain a temperature increase value of the heated item from the detected value of the temperature detection unit, obtain a system gain, which is a ratio of the temperature increase value of the heated item with respect to electric power inputted to the heater, and obtain, as a system gain change rate, a rate of change from an initial value of the system gain; and a heat retention change rate calculation unit configured to obtain a rate of change in heat retention of the heated item from the system gain change rate.

With this configuration, it is possible to detect a change related to heat retention of the heated item.

Also, in the example of the disclosure, the heating device further includes: a heater resistance value change rate calculation unit configured to obtain a resistance value of the heater from a voltage and a current applied to the heater and obtain, as a heater resistance value change rate, a rate of change from an initial value of the resistance value, and the heat retention change rate calculation unit obtains the rate of change in heat retention of the heated item from the system gain change rate and the heater resistance value change rate.

With this configuration, it is possible to detect deterioration of the heater in the heating device and a change related to heat retention of the heated item.

In addition, in the example of the disclosure, the heating device further includes: a heater voltage change rate calculation unit configured to obtain, as a heater voltage change rate, a rate of change from an initial value of a voltage applied to the heater, and the heat retention change rate calculation unit obtains the rate of change in heat retention of the heated item from the system gain change rate and the heater voltage change rate.

With this configuration, it is possible to detect a variation in voltage applied to the heater and a change related to heat retention of the heated item.

Also, in the example of the disclosure, the heating device further includes: a heater voltage change rate calculation unit configured to obtain, as a heater voltage change rate, a rate of change from an initial value of a voltage applied to the heater, and the heat retention change rate calculation unit obtains the rate of change in heat retention of the heated item from the system gain change rate, the heater resistance value change rate, and the heater voltage change rate.

With this configuration, it is possible to detect deterioration of the heater in the heating device, a variation in voltage applied to the heater, and a change related to heat retention of the heated item.

Also, in the example of the disclosure, the heating device further includes: a heat retention failure detection unit configured to detect a failure in the heat retention by comparing the heat retention change rate with a threshold for the heat retention change rate. With this configuration, it is possible to detect a failure related to heat retention of the heated item.

Also, in the example of the disclosure, the heating device further includes: a heater resistance value failure detection unit configured to detect a failure in the resistance value of the heater by comparing the heater resistance value change rate with a threshold value for the heater resistance value change rate. With this configuration, it is possible to detect a failure in the resistance value of the heater.

Also, in the example of the disclosure, the heating device further includes: a heater voltage failure detection unit configured to detect a failure in the voltage applied to the heater by comparing the heater voltage change rate with a threshold value for the heater voltage change rate. With this configuration, it is possible to detect a failure in voltage applied to the heater.

Also, according to an example of the disclosure, there is provided a failure detecting method of a heating device that includes a heater configured to heat an item, a temperature detection unit configured to detect a temperature of the heated item, and a temperature adjustment unit configured to control the heater on the basis of a detected value of the temperature detection unit and a target temperature so that the temperature of the heated item reaches the target temperature, the failure detecting method including: obtaining a temperature increase value of the heated item from the detected value of the temperature detection unit, obtaining a system gain, which is a ratio of the temperature increase value of the heated item with respect to electric power inputted to the heater, and obtaining, as a system gain change rate, a rate of change from an initial value of the system gain; and obtaining a rate of change in heat retention of the heated item from the system gain change rate and detecting a failure in the heating device depending on whether or not the rate of change in heat retention exceeds a threshold value.

With this configuration, it is possible to detect a change related to heat retention of the heated item and a failure in heating device.

Advantageous Effects of Invention

According to the invention, it is possible to detect a change related to heat retention of the heated item.

Figure 2:
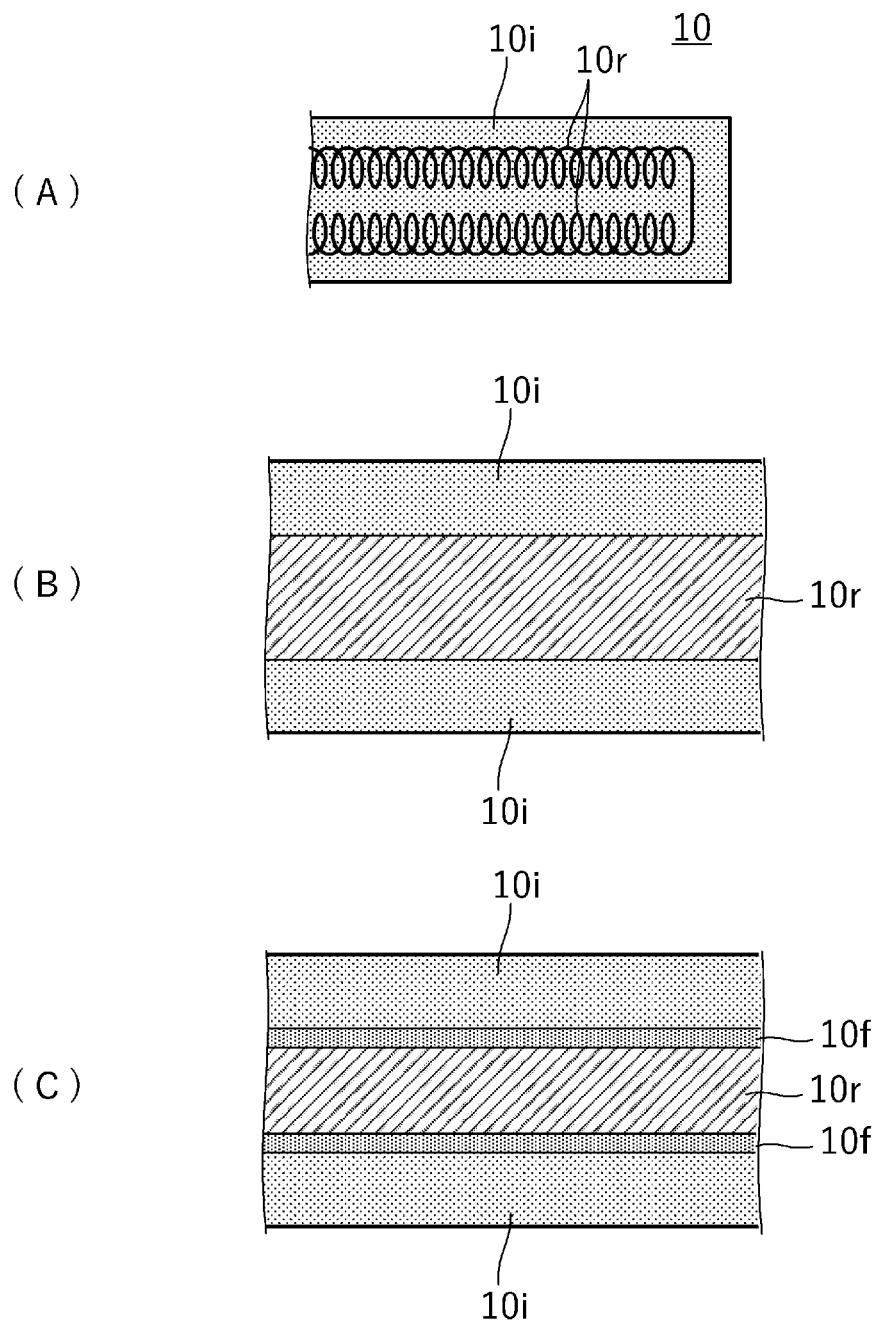

(A) of FIG. 2 is a sectional view illustrating a configuration inside a heater 10. (B) of FIG. 2 and (C) of FIG. 2 are enlarged sectional views illustrating a configuration inside the heater 10.

Figure 3:
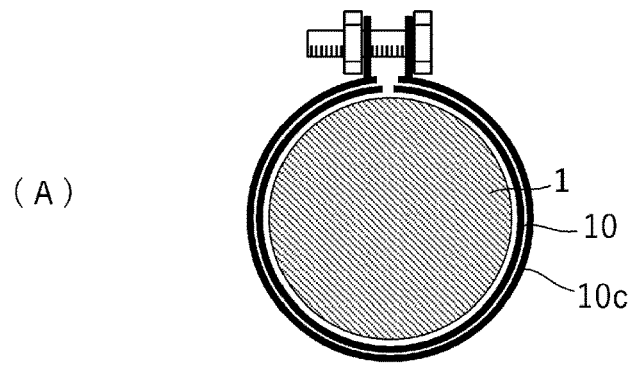
Figure 3:
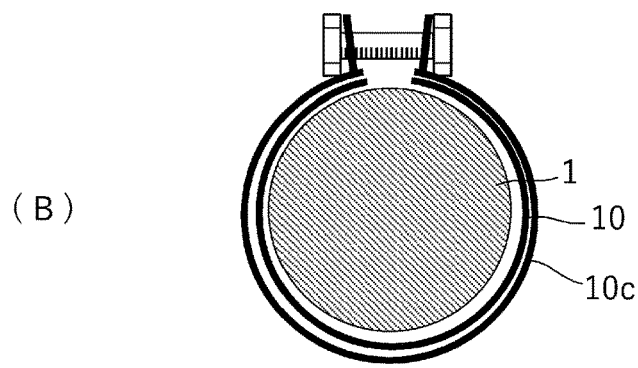

(A) of FIG. 3 and (B) of FIG. 3 are sectional views illustrating an example of "loosening" of the heater 10 and the like that heat an item 1.

Figure 4:
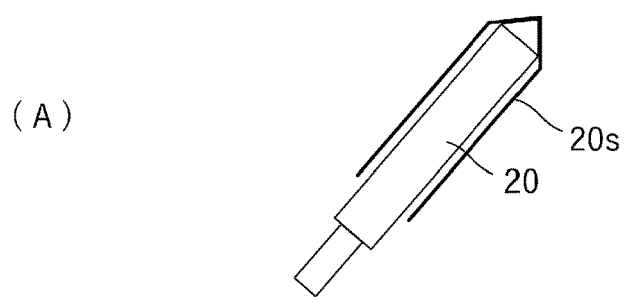
Figure 4:
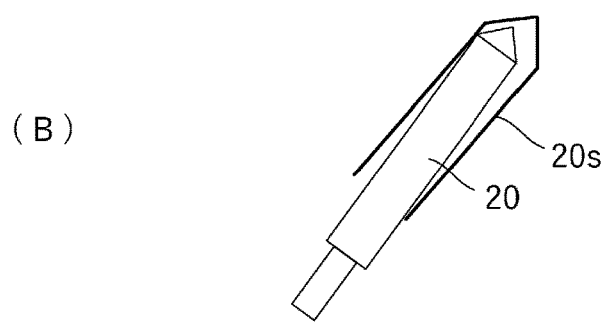

(A) of FIG. 4 and (B) of FIG. 4 are sectional views illustrating an example of "loosening" of a sleeve that covers a temperature detection unit 20.

Figure 5:
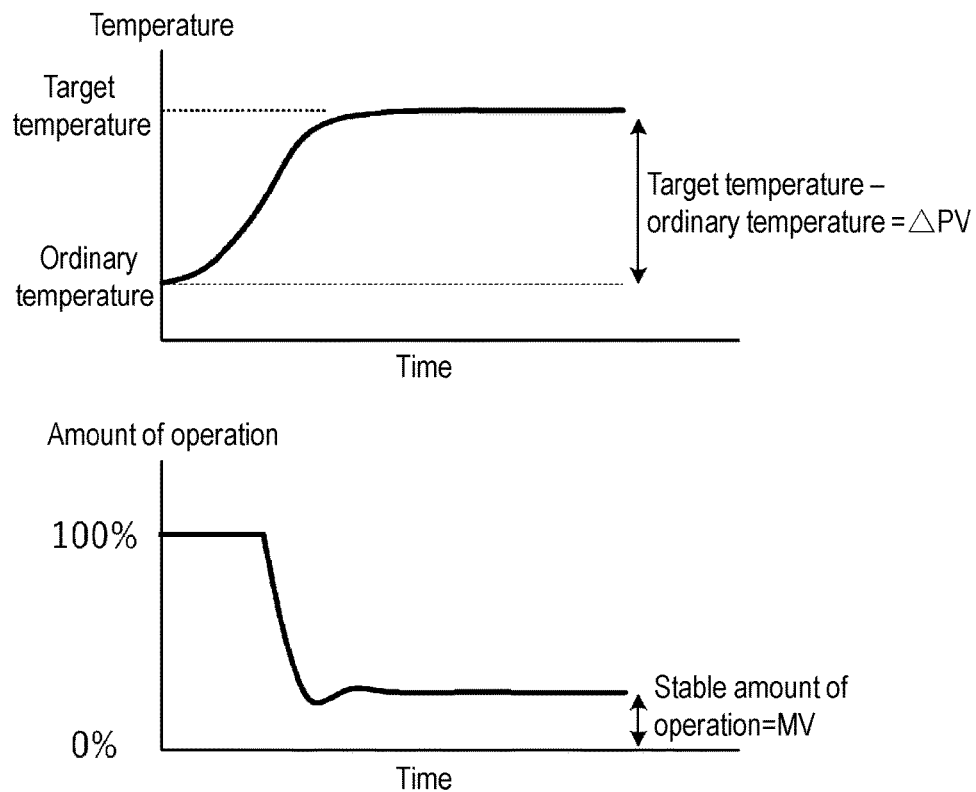

FIG. 5 is a diagram illustrating an example of a change in temperature of the heated item 1 and a change in the amount of operation of the heater 10.

Figure 6:
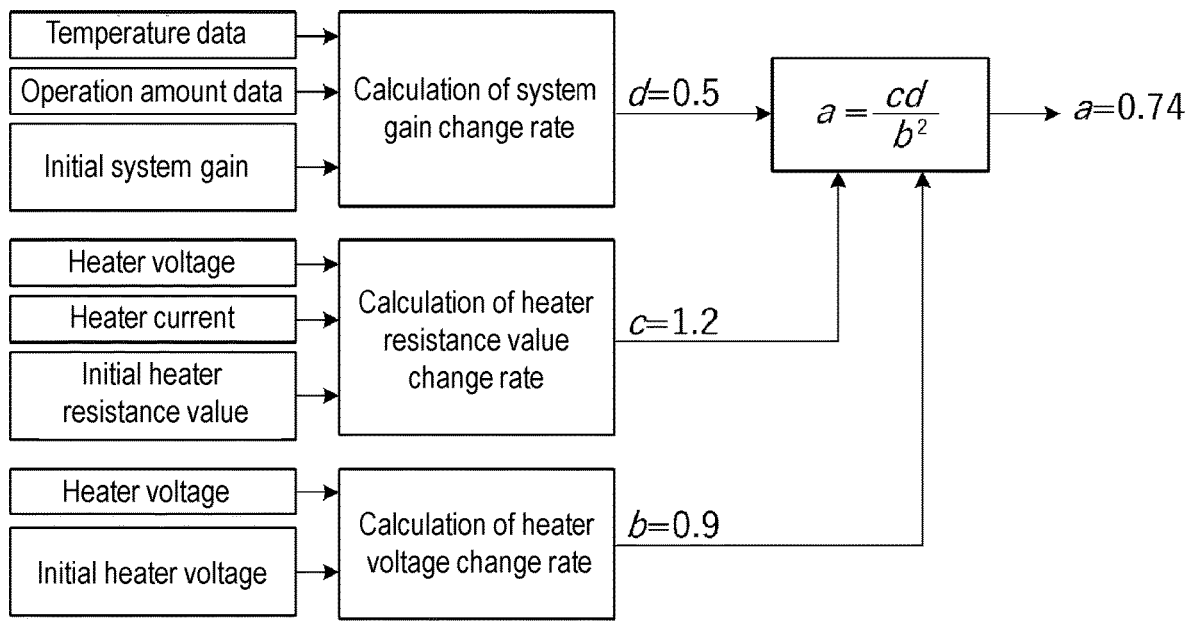

FIG. 6 is a block diagram illustrating details of an arithmetic operation performed as a system gain change rate calculation unit, an arithmetic operation performed as a heater resistance value change rate calculation unit, an arithmetic operation performed as a heater voltage change rate calculation unit, and an arithmetic operation performed as a heat retention change rate calculation unit.

FIG. 7 is a diagram illustrating a combination of abnormal states of the heating device 100.

DESCRIPTION OF EMBODIMENTS

Hereinafter, an embodiment for carrying out the invention will be described with reference to some drawings.

Application Example

Figure 1:
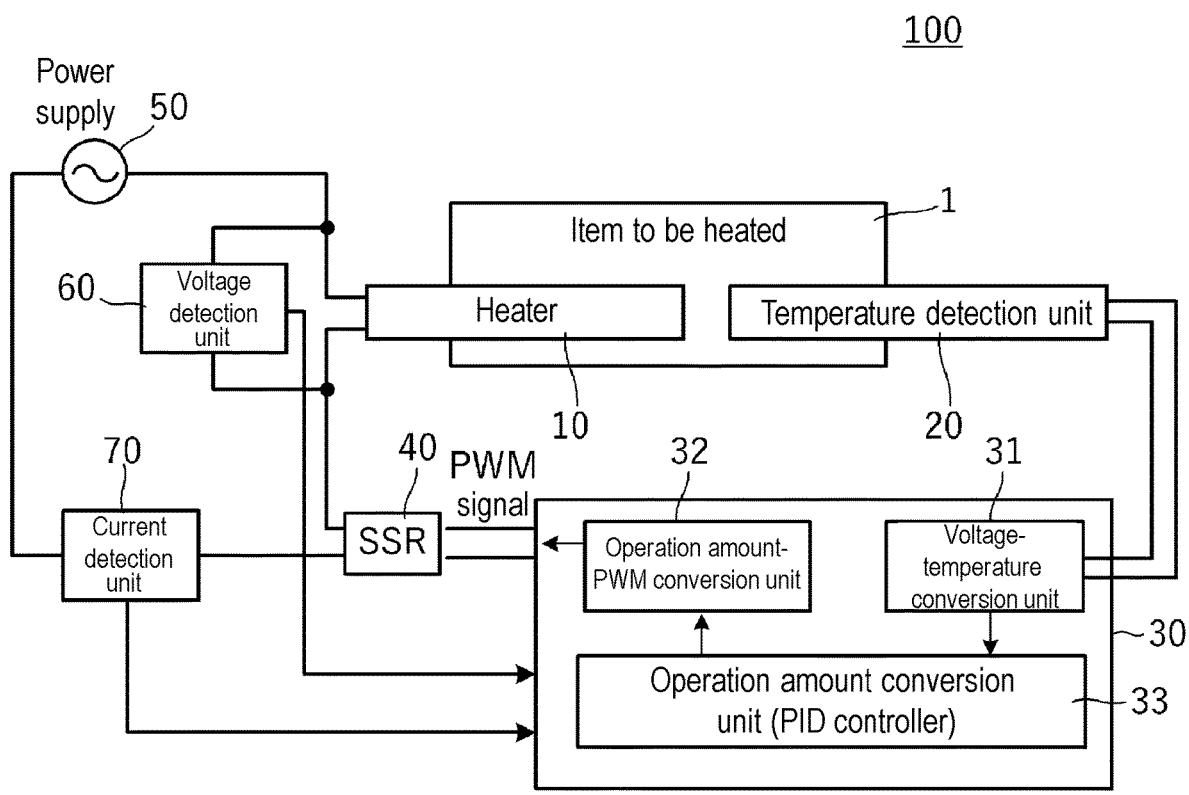
FIG. 1 is a diagram illustrating a configuration of a heating device 100 according to an embodiment of the invention.

First, an example to which the invention is applied will be described with reference to FIG. 1. FIG. 1 is a diagram illustrating a configuration of a heating device 100 according to an embodiment of the invention.

As illustrated in FIG. 1, the heating device 100 according to the embodiment includes a heater 10 configured to heat an item 1, a temperature detection unit 20 configured to detect a temperature of the heated item 1, and a temperature adjustment unit 30 configured to control the heater 10 such that the temperature of the heated item 1 reaches a target temperature on the basis of a detected value of the temperature detection unit 20 and the target temperature.

The temperature adjustment unit 30 includes a system gain change rate calculation unit, a heater resistance value change rate calculation unit, a heater voltage change rate calculation unit, and a heat retention change rate calculation unit. The system gain change rate calculation unit obtains a temperature increase value of the heated item 1 from the detected value of the temperature detection unit 20, obtains a system gain, which is a ratio of the temperature increase value of the heated item 1 with respect to electric power inputted to the heater 10, and obtains a rate of change from an initial value of the system gain. The heater resistance value change rate calculation unit obtains a resistance value of the heater 10 from a voltage and a current applied to the heater 10 and obtains a rate of change from an initial value of the resistance value. The heater voltage change rate calculation unit obtains a rate of change in voltage applied to the heater 10 from an initial value thereof. Also, the heat retention change rate calculation unit obtains a rate of change in heat retention of the heated item from the system gain change rate, the heater resistance value change rate, and the heater voltage change rate.

Configuration Example

Next, a configuration of the heating device according to the embodiment of the invention will be described with reference to the drawing. As described above, FIG. 1 is a diagram illustrating a configuration of the heating device 100 according to the embodiment of the invention.

As represented in FIG. 1, the heating device 100 includes the heater 10 configured to heat the heated item 1, the temperature detection unit 20 configured to detect the temperature of the item 1, the temperature adjustment unit 30 configured to control the heater 10 on the basis of the detected value of the temperature detection unit 20 and the target temperature, a solid state switch 40, a heater power supply 50, a voltage detection unit 60 configured to detect a voltage applied to the heater, and a current detection unit 70 configured to detect a current flowing through the heater 10. The item 1 is a molded article of metal or the like. Since FIG. 1 is a block configuration diagram and the item 1 is conceptually illustrated, an actual shape thereof is appropriately defined.

The item 1 is a heating unit of a packaging machine configured to heat a resin and package an article, for example. The heater 10 and the temperature detection unit 20 are provided in the heating unit.

The temperature adjustment unit 30 includes a voltage-temperature conversion unit 31 configured to convert a voltage output from the temperature detection unit 20 into a temperature information signal, an operation amount-PWM conversion unit 32 configured to perform PWM control on the solid state switch 40, and an operation amount conversion unit 33. The operation amount conversion unit 33 is a PID controller and obtains the amount of operation through PID control on the basis of temperature information and target temperature information obtained by the voltage-temperature conversion unit 31.

In addition, the operation amount conversion unit 33 performs an arithmetic operation as the system gain change rate calculation unit, an arithmetic operation as the heater resistance value change rate calculation unit, an arithmetic operation as the heater voltage change rate calculation unit, and an arithmetic operation as the heat retention change rate calculation unit. These arithmetic operations will be described in detail below.

(A) of FIG. 2 is a sectional view illustrating a configuration inside the heater 10. The heater 10 is configured of an insulating body 10i and a coil-shaped heat generating resistance wire 10r incorporated in the insulating body 10i. Although the heat generating resistance wire 10r is covered with the insulating body 10i in an initial state as illustrated in (B) of FIG. 2, an oxide film 10f forms on the surface of the heat generating resistance wire 10r as illustrated in (C) of FIG. 2 due to aging, and a diameter of a power distribution part of the heat generating resistance wire 10r becomes thinner in accordance with the aging. If the oxide film 10f becomes thicker due to such aging, and the power distribution part of the heat generating resistance wire 10r becomes thinner, disconnection may eventually occur.

As illustrated in (A) of FIG. 2 and (B) of FIG. 2, a heater resistance value of the heater 10 varies due to aging. In other words, a rate of change from an initial state gradually changes. In addition, the system gain also varies due to a change in resistance value of the heater 10.

(A) of FIG. 3 and (B) of FIG. 3 are sectional views illustrating an example of "loosening" of the heater 10 and the like configured to heat the item 1. In a normal situation, the heater (band heater) 10 is wound around an outer periphery of the item 1 in a close contact state as illustrated in (A) of FIG. 3. Also, the outer periphery of the heater 10 is covered with a cover 10c that covers the heater 10. (B) of FIG. 3 is an example of a failure in which a gap is generated between the outer periphery of the item 1 and the heater 10 and a gap is also generated between the heater 10 and the cover 10c.

In this manner, the system gain, which will be described later, varies due to a change, that is "loosening" in an attachment state of the heater 10 and an attachment state of the cover. In other words, the system gain may vary from the initial state with utilization of the heating device.

(A) of FIG. 4 and (B) of FIG. 4 are sectional views illustrating an example of "loosening" of a sleeve that covers the temperature detection unit 20. The temperature detection unit 20 is, for example, a thermocouple. In a normal situation, a leading end of the temperature detection unit 20 is in close contact with a sleeve 20s as illustrated in (A) of FIG. 4. (B) of FIG. 4 is an example of a failure in which a gap is generated between the leading end of the temperature detection unit 20 and the sleeve 20s.

In this manner, the system gain, which will be described later, varies due to a change, that is "loosening" in a state of an attachment portion of the temperature detection unit 20. In other words, the system gain may vary from the initial state with utilization of the heating device.

FIG. 5 is a diagram illustrating an example of a change in temperature of the heated item 1, and a change in the amount of operation of the heater 10 with elapse of time. The temperature of the heated item 1 rises from an ordinary temperature (initial temperature) to a target temperature (stable temperature) with elapse of time. Meanwhile, the amount of operation of the heater 10 starts from 100%, decreases with elapse of time, and stabilizes at a stable amount of operation.

Here, if the difference between the target temperature and the ordinary temperature is represented as ΔPV, and the stable amount of operation is represented as MV, a system gain K is represented by the following equation since the system gain is a ratio of the temperature increase value of the heated item 1 with respect to the electric power inputted to the heater 10.

$$K = \Delta PV / MV$$

FIG. 6 is a block diagram illustrating details of an arithmetic operation performed as the system gain change rate calculation unit, an arithmetic operation performed as the heater resistance value change rate calculation unit, and an arithmetic operation performed as the heater voltage change rate calculation unit.

Here, if the gain related to a heat transmission coefficient between the item 1 and the temperature detection unit 20 is represented as B, the voltage applied to the heater 10 is represented as V, and the resistance value of the heater 10 is represented as R, the system gain K is also represented by the following equation.

$$K = B \times V^2 / R$$

The resistance value R of the heater 10 is obtained by $$R = V/i$$

where the heater voltage is represented as V, and the heater current is represented as i.

If the system gain at a timing at which the system gain change rate is obtained is represented as K', the rate of change in gain related to the heat transmission coefficient between the item 1 and the temperature detection unit 20 is represented as a, the rate of change in heater voltage is represented as b, and the rate of change in heater resistance value is represented as c, the system gain K' after a variation is represented by the following equation.

$$K' = aB \times (bV)^2 / cR$$

Also, if the initial system gain is represented as K, and the system gain at the timing at which the system gain change rate is obtained is represented as K', the system gain change rate d is represented by the following equation.

$$d = K'/K$$

$$= ab^2/c$$

In addition, it is possible to state that the rate of change a in the gain related to the heat transmission coefficient between the item 1 and the temperature detection unit 20 is a rate of change in heat retention of the item 1. Therefore, it is possible to obtain the rate of change a in heat retention using the following equation.

$$a = cd/b^2$$

An arithmetic operation performed by the operation amount conversion unit 33 illustrated in FIG. 1, as the heater resistance value change rate calculation unit is as follows.

If an initial resistance value of the heater 10 is represented as R, and a resistance value at a timing at which the heater resistance value change rate is obtained is represented as R', the heater resistance value change rate calculation unit obtains the heater resistance value change rate c using the following equation.

$$c = R'/R$$

In addition, an arithmetic operation performed as the heater voltage change rate calculation unit is as follows.

If an initial voltage applied to the heater 10 is represented as V, and a voltage at the timing at which the heater voltage change rate is obtained is represented as V', the heater voltage change rate calculation unit obtains the heater voltage change rate b using the following equation.

$$b = V'/V$$

In addition, the rate of change a in heat retention is obtained from the system gain change rate d, the heater resistance value change rate c, and the heater voltage change rate b.

As illustrated in FIG. 6, it is possible to recognize that if d=0.5, c=1.2, and b=0.9, for example, the rate of change a in heat retention is 0.74, that is, a state in which the heat retention has dropped by 26% has been achieved.

FIG. 7 is a diagram illustrating a combination of abnormal states of the heating device 100. Since there are three failures, namely a failure in the resistance value of the heater 10, a failure in heater voltage, and a failure in heat retention of the heated item, in the heating device 100, there are seven combinations of abnormal states.

In a state in which the heater resistance value change rate c exceeds a predetermined threshold value, the resistance value of the heater 10 is regarded as being "abnormal". When c>1.2, for example, the heater resistance value is regarded as being abnormal.

Also, in a state in which the heater voltage change rate b exceeds a predetermined threshold value, the heater voltage is regarded as being "abnormal". For example, the heater voltage is regarded as being abnormal when b<0.9 or b>1.1.

Also, in a state in which the rate of change a in heat retention exceeds a predetermined threshold value, the are regarded as being "abnormal". For example, the heat retention are regarded as being abnormal when a<0.74.

In this manner, any of the abnormal states can individually be detected.

Also, there is a concern that in a case in which properties (system gain) of the heating device, that is, the heater voltage, the heater resistance value, the heat retention, and the like have varied, temperature control performance may be degraded due to the variations. However, in a state in which the given heater voltage change rate, the heater resistance value change rate, and the rate of change in heat retention are small, it is possible to maintain the temperature control performance by calculating a proportional band (P in PID control) again from the new heater voltage, heater resistance value, and heat retention.

Finally, it is a matter of course that the above description of the embodiment for carrying out the invention has been provided only for illustrative purposes in terms of all points and is not intended to be restrictive. It is possible for those skilled in the art to appropriately add modifications and changes. Although the amount of variation from the initial value is obtained for each parameter to detect a failure in the aforementioned example, for example, it is not necessary to fix at which point a value is defined as the initial value. For example, a system gain at a timing at which the target temperature is reset may be defined as an initial value of the system gain, a resistance value of the heater at that timing may be defined as an initial value of the heater resistance value, and a heater voltage at that timing may be defined as an initial value of the heater voltage.

The invention claimed is:

1. A heating device that includes a heater configured to heat an item, a temperature detection unit configured to detect a temperature of the item heated, and a temperature adjustment unit configured to control the heater on the basis of a detected value of the temperature detection unit and a target temperature so that the temperature of the item heated reaches the target temperature, the heating device comprising:
a system gain change rate calculation unit configured to obtain a temperature increase value of the item heated from the detected value of the temperature detection unit, obtain a system gain, which is a ratio of the temperature increase value of the item heated with respect to electric power inputted to the heater, and obtain, as a system gain change rate, a rate of change from an initial value of the system gain; and
a heat retention change rate calculation unit configured to obtain a rate of change in heat retention of the item heated from the system gain change rate.

2. The heating device according to claim 1, further comprising:
a heater resistance value change rate calculation unit configured to obtain a resistance value of the heater from a voltage and a current applied to the heater and obtain, as a heater resistance value change rate, a rate of change from an initial value of the resistance value,
wherein the heat retention change rate calculation unit obtains the rate of change in heat retention of the item heated from the system gain change rate and the heater resistance value change rate.

3. The heating device according to claim 1, further comprising:
a heater voltage change rate calculation unit configured to obtain, as a heater voltage change rate, a rate of change from an initial value of a voltage applied to the heater,
wherein the heat retention change rate calculation unit obtains the rate of change in heat retention of the item heated from the system gain change rate and the heater voltage change rate.

4. The heating device according to claim 2, further comprising:
a heater voltage change rate calculation unit configured to obtain, as a heater voltage change rate, a rate of change from an initial value of a voltage applied to the heater,
wherein the heat retention change rate calculation unit obtains the rate of change in heat retention of the item heated from the system gain change rate, the heater resistance value change rate, and the heater voltage change rate.

5. The heating device according to claim 1, further comprising:
a heat retention failure detection unit configured to detect a failure in the heat retention by comparing the rate of change in heat retention with a threshold for the rate of change in heat retention.

6. The heating device according to claim 2, further comprising:
a heater resistance value failure detection unit configured to detect a failure in the resistance value of the heater by comparing the heater resistance value change rate with a threshold value for the heater resistance change rate.

7. The heating device according to claim 3, further comprising:
a heater voltage failure detection unit configured to detect a failure in the voltage applied to the heater by comparing the heater voltage change rate with a threshold value for the heater voltage change rate.

8. A failure detecting method of a heating device that includes a heater configured to heat an item, a temperature detection unit configured to detect a temperature of the item heated, and a temperature adjustment unit configured to control the heater on the basis of a detected value of the temperature detection unit and a target temperature so that the temperature of the item heated reaches the target temperature, the failure detecting method comprising:

obtaining a temperature increase value of the item heated from the detected value of the temperature detection unit, obtaining a system gain, which is a ratio of the temperature increase value of the item heated with respect to electric power inputted to the heater, and obtaining, as a system gain change rate, a rate of change from an initial value of the system gain; and obtaining a rate of change in heat retention of the item heated from the system gain change rate and detecting a failure in the heating device depending on whether or not the rate of change in heat retention exceeds a threshold value.

* * * * *